(12) United States Patent
Bou et al.

(10) Patent No.: US 7,000,197 B1
(45) Date of Patent: Feb. 14, 2006

(54) METHOD AND APPARATUS FOR INFERRED SELECTION OF OBJECTS

(75) Inventors: Robert E. Bou, Austin, TX (US); Jack M. Bayt, Clovis, CA (US)

(73) Assignee: Autodesk, Inc., San Rafael, CA (US)

( * ) Notice: Subject to any disclaimer, the term of this patent is extended or adjusted under 35 U.S.C. 154(b) by 1073 days.

(21) Appl. No.: 09/585,508

(22) Filed: Jun. 1, 2000

(51) Int. Cl.
*G06F 3/00* (2006.01)

(52) U.S. Cl. ..................... 715/812; 715/862

(58) Field of Classification Search .............. 345/862, 345/812, 754, 813–814, 822
See application file for complete search history.

(56) References Cited

U.S. PATENT DOCUMENTS

| | | | |
|---|---|---|---|
| 4,951,231 | A | 8/1990 | Dickinson et al. |
| 5,101,436 | A | 3/1992 | DeAguiar et al. |
| 5,123,087 | A | 6/1992 | Newell et al. |
| 5,133,052 | A | 7/1992 | Bier et al. |
| 5,237,647 | A | 8/1993 | Roberts et al. |
| 5,325,475 | A | 6/1994 | Poggio et al. |
| 5,371,845 | A | 12/1994 | Newell et al. |
| 5,396,590 | A | 3/1995 | Kreegar |
| 5,444,836 | A | 8/1995 | Hollingsworth et al. |
| 5,490,241 | A | 2/1996 | Mallgren et al. |
| 5,511,157 | A * | 4/1996 | Wang ............... 345/652 |
| 5,513,303 | A | 4/1996 | Robertson et al. |
| 5,513,309 | A | 4/1996 | Meier et al. |
| 5,572,639 | A | 11/1996 | Gantt |
| 5,588,098 | A * | 12/1996 | Chen et al. .......... 345/653 |
| 5,627,949 | A | 5/1997 | Letcher, Jr. |

(Continued)

OTHER PUBLICATIONS

Townsend et al., Microsoft Office 6 in 1, 1994, Que Corporation, pp 713. *The Microsoft Agent Programming Interface: ActiveX™ Technology for Interactive Software Agents*, Beta version, Oct. 18, 1996, Microsoft Corporation, 48 pages.

(Continued)

*Primary Examiner*—Sy D. Luu
*Assistant Examiner*—Le Nguyen
(74) *Attorney, Agent, or Firm*—Gates & Cooper LLP (57) ABSTRACT

One or more embodiments of the invention comprises a collection of techniques to infer the real construction of a collection of graphical elements. Typically the underlying graphical elements of a physical object have a parent-child relationship in the graphical display and picking database. The invention examines the children of a parent seeking relationships like co-linear, closed polygon, etc., and then answers "hit" detect queries for areas that are not specifically stroked, but are also inferred to be "real", e.g., spaces in a dashed or patterned line, the area of a closed polygon, etc. Certain allowances and flexibility must be taken into account in this process. For example, one or more embodiments do not include "text" children on a stroke by stroke basis, but instead may look to the bounding box of the text for selection. One or more embodiments of the invention obtain a selection request from the user. The system and method of the invention examines existing objects to determine and obtain relationships between the objects. Virtual objects that join the existing objects or are complimentary to the existing objects are created based on the relationships. Subsequently, whenever an object is selected (whether the object is an existing object or a virtual object), the object selected and its related objects are selected. In this manner, the physical shape of a graphically represented object may be inferred and utilized by a graphics program and users.

18 Claims, 6 Drawing Sheets

U.S. PATENT DOCUMENTS

| | | | |
|---|---|---|---|
| 5,633,955 | A | 5/1997 | Bozinovic et al. |
| 5,704,028 | A | 12/1997 | Schanel et al. |
| 5,712,965 | A | 1/1998 | Fujita et al. |
| 5,734,805 | A | 3/1998 | Isensee et al. |
| 5,734,806 | A | 3/1998 | Narayanaswami |
| 5,734,807 | A | 3/1998 | Sumi |
| 5,784,068 | A | 7/1998 | Brown |
| 5,793,377 | A | 8/1998 | Moore |
| 5,808,604 | A * | 9/1998 | Robin .................. 345/862 |
| 5,815,415 | A | 9/1998 | Bentley et al. |
| 5,894,310 | A * | 4/1999 | Arsenault et al. ........... 345/679 |
| 6,320,601 | B1 * | 11/2001 | Takasu et al. ............... 345/764 |
| 6,459,442 | B1 * | 10/2002 | Edwards et al. ............ 345/863 |

OTHER PUBLICATIONS

*The Microsoft Agent User Interface: ActiveX™ Technology for Interactive Software Agents,* Beta version, Oct. 18, 1996, Microsoft Corporation, 10 pages.

*What Is ActiveX?* Oct. 16, 1996, Microsoft, 3 pages.

*Microsoft Agent: ActiveX™ Technology for Interactive Software Agents,* Beta version, Oct. 8, 1996, Microsoft Corporation, 2 pages.

*AutoCAD 14: ObjectARX Proxy Objects,* Autodesk, Inc., © 1997, pp. 1-7.

*AutoCAD 14: Object Technology Inside AutoCAD,* Autodesk, Inc., © 1997, pp. 1-11.

* cited by examiner

METHOD AND APPARATUS FOR INFERRED SELECTION OF OBJECTS

CROSS-REFERENCE TO RELATED APPLICATION(S)

This application is related to the following co-pending and commonly-assigned patent application(s), which are incorporated by reference herein:

Application Ser. No. 09/265,021, filed on Mar. 9, 1999, by Robert E. Bou, entitled "AFFINITIVE PLACEMENT BY PROXIMITY IN A COMPUTER-IMPLEMENTED GRAPHICS SYSTEM";

Application Ser. No. 09/388,799, filed on Sep. 2, 1999, by Robert E. Bou et al., entitled "CONSTRUCTIVE SYSTEMS FOR OBJECTS IN A COMPUTER-IMPLEMENTED GRAPHICS SYSTEM"; and Application Ser. No. 09/226,688, filed on Jan. 7, 1999, by Robert E. Bou et al., entitled "HIDDEN EDGE SELECTION IN A COMPUTER-IMPLEMENTED GRAPHICS SYSTEM"; and Application Ser. No. 08/890,018, filed on Jul. 10, 1997, by William L. Jordan et al., entitled "APPLICATION COACH FOR COMPUTER PROGRAMS".

BACKGROUND OF THE INVENTION

1. Field of the Invention

The present invention relates generally to computer-implemented graphics systems, and in particular, to selecting objects.

2. Description of the Related Art

Computer-implemented graphics systems have been widely used by designers, illustrators, drafters, and engineers for a number of years. Most such graphics systems use a two-dimensional (2D) graphical user interface (GUI) to display graphical images, such as 2D or three-dimensional (3D) models, schematic diagrams, photo-realistic images, etc.

Graphic applications typically represent objects (e.g., a tree, a wall, a switch, etc.) with graphical elements that have a different visual representation than their actual physical construction. Such a visual representation may consist of multiple discrete objects. For example, a gross level of such visual representation is a simple circle with the letters "MH" inside that might be indicative of a manhole in a street plan. Such a visual representation may be comprised of multiple discrete objects such as a circle object and a text object. The discrete objects may also consist of multiple objects. For example, the text "MH" may consist of multiple stroke objects for each line that comprises each letter. Another slightly more subtle example is a gas line that is displayed as a dashed patterned line when in fact the physical gas line is continuous. The dashed patterned line may consist of multiple discrete line objects for each dash. A further example is a closed polygon representing a land parcel where the graphical representation is only the boundary, while the physical manifestation is actually the enclosed area.

Users often select one or more objects in a graphics program. The selected objects may then be modified, edited, deleted, etc. When a user seeks to select specific objects for further manipulation or where a user is querying areas for "crossing" objects (i.e., does this building pad cross any gas lines) the graphics program may rely on schematically segmented representations (the individual discrete objects) for providing the objects to answer the search criteria. Specifically, the graphics program determines whether the graphical representation "hits" the area of interest. Such an approach is adequate when all objects are graphically represented as they are physically constructed. However, as noted previously, this is not always the case. For example, to select a dashed pattern line, the user may have to select each individual line segment and not the space between the segments.

In some prior art methods, multiple objects may be "grouped" together by a user such that if one object "hits" the area of interest, all of the other objects in the group are returned to answer the search criteria. However, the grouping must be manually performed by the user or a preexisting object is selected that is already "grouped."

These problems may be better understood by describing prior art object selection and groups.

Selecting Objects

In prior art graphics programs, before a user can edit one or more objects, a user needs to create a selection set of the objects. A selection set can consist of a single object, or it can be a more complex grouping (e.g., the set of objects of a certain color on a certain layer). A user can create the selection set either before or after choosing an editing command. A user can make several changes to the same selection set. In the prior art, one of the following methods may be used to create selection sets:

1. A user first selects an editing command. A user then select the objects and presses ENTER.
2. A user types in "select", selects the objects, and presses ENTER.
3. A user selects the objects with the pointing device.
4. A user defines groups.

When a user chooses an editing command, a graphics program such as AutoCAD® available from the assignee of the present invention, Autodesk, Inc., prompts the user to select objects and replaces crosshairs with a pickbox. The user can then select individual objects with the pointing device or by using the methods described below.

A user can respond to a Select Objects prompt in various ways. For example, a user can select the most recently created object, the previous selection set, or all objects in the drawing. Additionally, a user can add objects to and remove objects from a selection set. More than one selection method may be used to make a selection. For example, to select most of the objects in the graphics area, a user can select all of the objects and then remove the unwanted objects.

A user can also select objects by enclosing them in a selection window. A selection window is a rectangular area that a user defines in the graphics area by specifying two corner points at a Select Objects prompt. In some graphics applications, the order in which the points are specified makes a difference. For example, by dragging from left to right (window selection) selects only objects entirely within the selection area. Dragging from right to left (crossing selection) selects objects within and crossing the selection area. In some graphics applications objects must be at least partially visible to be selected. For example, when selecting objects with the window option, usually the entire object must be contained in the window. However, if the object extends off screen, but all the visible vectors (non-continuous linetypes) can be enclosed within the window, the entire object may be selected.

To select objects within an irregularly shaped area, a user may enclose the objects in a polygon selection window. First, the user creates a window by specifying points to enclose the area. The order in which the points are specified defines a window or a crossing polygon. A window polygon selects only objects that the polygon encloses entirely, and a crossing polygon selects objects the polygon encloses or crosses.

To select objects within an irregularly shaped area, graphics programs may utilize one or more of the following steps:
1. At the Select Objects prompt, the user enters cp for Crossing Polygon.
2. The user specifies points from left to right to define an area that entirely encloses the desired lines.
3. The user presses ENTER to close the polygon and complete the selection.

A user can select nonadjacent objects in a complex drawing most easily with a selection fence. A fence is a line that selects all the objects it passes through. To select nonadjacent objects with a fence, a graphics program may utilize one or more of the following steps:
1. At the Select Objects prompt, the user enters f (Fence).
2. The user specifies the fence points.
3. The user presses ENTER to complete the selection.

It is difficult to select objects that are close together or lie directly on top of one another. In some graphics programs, a user can use the pick button to cycle through such objects, one after the other, until the user reaches the one desired.

To cycle through objects for selection, some graphics programs utilize one or more of the following steps:
1. At the Select Objects prompt, the user holds down CTRL and selects a point as near as possible to the object desired.
2. The user then presses the pick button on the pointing device (e.g., a mouse) repeatedly until the object desired is highlighted.
3. The user presses ENTER to select the object.

A user can control how objects are selected by choosing the selection mode, pickbox size, and object sorting method. A user can also limit selection sets by property, such as color, or by object type by using filter lists. For example, objects may be filtered such that only the red objects in a circuit board drawing or only objects on a certain layer are selected. A filter list may be created after starting an editing command. Filter lists can also be named and saved in a file for repeat use.

After a user creates a selection set, individual objects can be removed from that set. For example, an entire group of densely grouped objects can be selected and then specific objects from within the group may be removed, leaving only the desired objects left in the set. Further, in some graphics programs, a user can choose to remove objects only while object selection is already in progress or when objects in a selection set are highlighted and have grips. Additionally, in some graphics programs, objects can be removed from a selection set by pressing the SHIFT key as the object is selected.

There are several ways a user can select objects before choosing a method of editing them. For example, the SELECT command provides all the options that can be used at the Select Objects prompt. Objects can also be selected with the pointing device so that they are marked with grips, if grips are turned on (grips mark control locations on a selected object). For example, selecting a block turns on a grip at its insertion point. A selected group doesn't have a location that can be associated with it like the insertion point of a block. When a group is selected, each member of the group is marked with its own grips.

With grips, a user can use the pointing device to combine command and object selection and therefore edit more quickly. When grips are turned on, objects are selected before editing. With the grips, objects can be manipulated with the graphics cursor or keywords. Further, by using grips, a user can reduce the use of menus.

To accommodate the above selection techniques, prior art graphics applications may "cast a ray". Using such a technique, the user picks a point in space and a ray or vector is cast into the viewport database. If an object intersects with the vector, the object is highlighted indicating that the object has been selected. If an object does not intersect with the vector, the object is not highlighted or selected.

Groups

In prior art graphics programs, a group is a named selection set of objects. Unlike unnamed selection sets, groups are saved with the drawing. Group definitions are maintained when a drawing is used as an external reference or inserted in another drawing. However, until external references have been bound and exploded or blocks have been exploded, a user does not have direct access to groups that have been defined in an external reference or block.

When a user creates or edits a group, the user can specify whether it is selectable. If a group is selectable, selecting one of the group's members selects all members in the current space that meet the selection criteria (for example, members on locked layers are not selectable). The ability to select groups is also affected by a PICKSTYLE system variable. When PICKSTYLE is off for group selection, a user can individually select group members. An object can be a member of more than one group. A user can list all of the groups to which a selected object belongs. Further, group members are numerically ordered and can be reordered. Reordering may be useful in some batch operations on objects or when it's important which object is "on top" for display purposes.

When a group is created, the user gives the group a name and description. If a group is copied, the copy is given the default name "Ax" and is considered unnamed. Unnamed groups are not listed in the Object Grouping dialog box unless the user elects to include unnamed objects.

If a member of a selectable group is chosen for inclusion in a new group, all members of that selectable group are included in the new group. A group may be selected by name at a Select Objects prompt. If a PICKSTYLE system variable is set to 1 or 3 and the user selects any member of a selectable group, all group members that meet the selection criteria are selected. Group selection may be toggled on and off by pressing CTRL+A.

All members of selectable groups are also selected when object selection cycling is used. For example, using object selection cycling, an object that lies directly behind another object may be selected. Selecting an object that is a member of multiple selectable groups selects all the members of all the groups that contain that object. To select groups for editing with grips, the pointing device is used to select the group at the Command prompt.

At any time, a user can add or remove group members and rename groups. Also, a user can copy, mirror, and array groups. Erasing a group member deletes that object from the group definition. When a group member is included in a deleted block, the object is deleted from the drawing and also from the group. If deleting an object or removing it from a group leaves the group empty, the group remains defined. A group definition can be removed by exploding the group. Exploding groups deletes them from a drawing. Objects that were part of the group remain in the drawing.

A user can alter the group's member order, its description, and whether it's selectable. Two methods may be utilized to reorder group members: change the numerical position of individual or ranges of group members, or reverse the order of all members.

As described above, selecting objects and defining groups are manual processes that must be performed by a user. It is desirable to have an automated process for selecting objects without a user having to toggle through multiple objects or manually select the objects.

SUMMARY OF THE INVENTION

One or more embodiments of the invention provide for selecting objects using an inference technique. One or more embodiments of the invention comprise a collection of techniques to infer the real construction of a collection of graphical elements. Typically, the underlying graphical elements of a physical object have a parent-child relationship in the graphical display and picking database. The invention examines the children of a parent seeking relationships like co-linear, closed polygon, etc., and then answers "hit" detect queries for areas that are not specifically stroked, but are also inferred to be "real", e.g., spaces in a dashed or patterned line, the area of a closed polygon, etc. Certain allowances and flexibility must be taken into account in this process. For example, one or more embodiments do not include "text" children on a stroke by stroke basis, but instead may look to the bounding box of the text for selection.

One or more embodiments of the invention obtain a selection request from the user. The system and method of the invention examines existing objects to determine and obtain relationships between the objects. Virtual objects that join the existing objects or are complimentary to the existing objects are created based on the relationships. Subsequently, whenever an object is selected (whether the object is an existing object or a virtual object), the object selected and its related objects are selected. In this manner, the physical shape of a graphically represented object may be inferred and utilized by a graphics program and users.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 1:
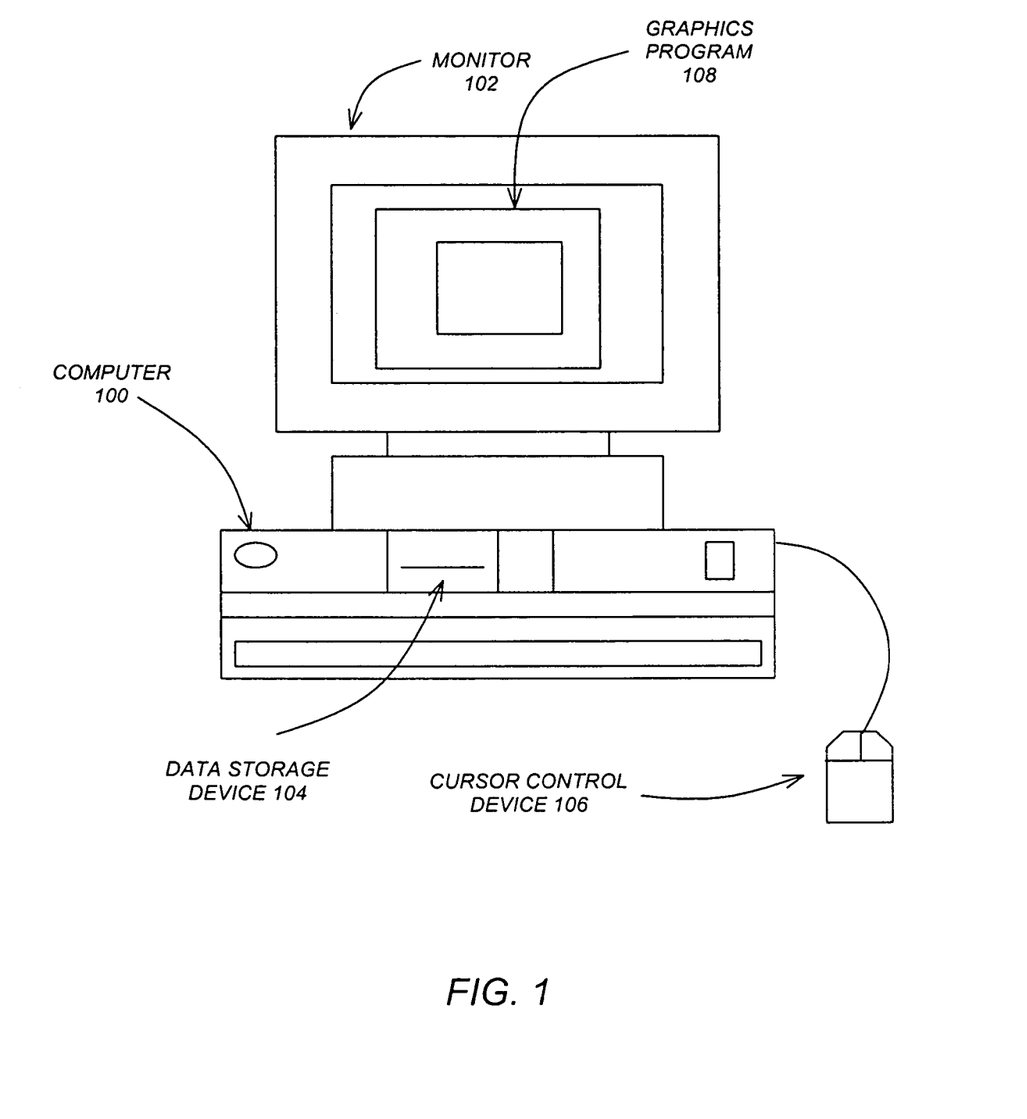
FIG. 1 is an exemplary hardware environment used to implement one or more embodiments of the invention.

FIG. 1 is an exemplary hardware and software environment used to implement one or more embodiments of the invention. One or more embodiments of the invention are typically implemented using a computer 100, which generally includes, inter alia, a monitor 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented graphics program 108, wherein the graphics program 108 is represented by a window displayed on the monitor 102. Generally, the graphics program 108 comprises logic and/or data embodied in or readable from a device, media, or carrier, e.g., one or more fixed and/or removable data storage devices 104 connected directly or indirectly to the computer 100, one or more remote devices coupled to the computer 100 via a data communications device, etc.

Those skilled in the art will recognize that the exemplary environment illustrated in FIG. 1 is not intended to limit the present invention. Indeed, those skilled in the art will recognize that other alternative environments may be used without departing from the scope of the present invention.

Computer-Implemented Graphics Program

Figure 2:
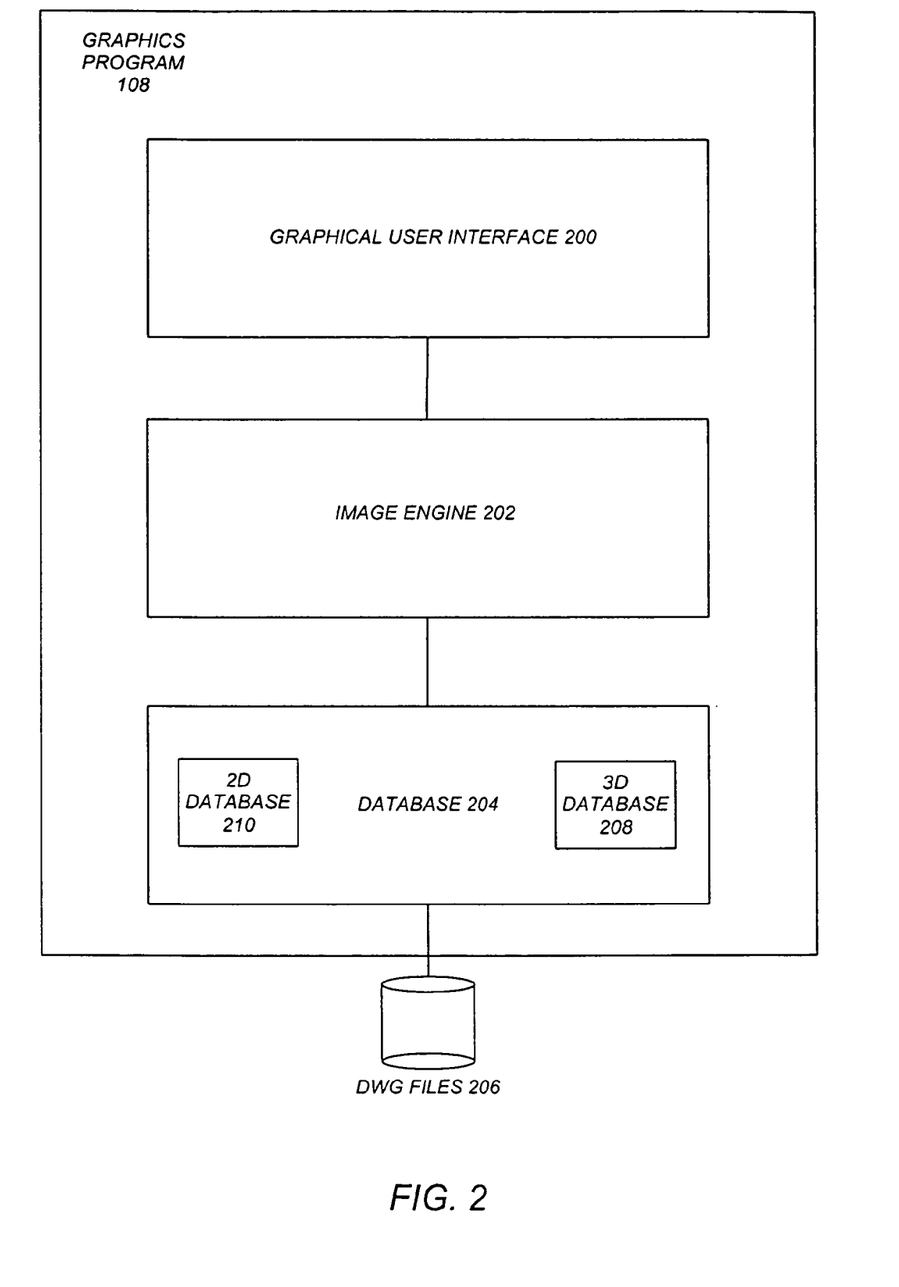
FIG. 2 is a block diagram that illustrates the components of the computer-implemented graphics program in accordance with one or more embodiments of the invention.

FIG. 2 is a block diagram that illustrates the components of the graphics program 108 in accordance with one or more embodiments of the invention. There are three main components to the graphics program 108, including: a Graphical User Interface (GUI) 200, an Image Engine (IME) 202, and a DataBase (DB) 204 for storing objects in Drawing (DWG) files 206. In one or more embodiments of the invention, Graphics program 108 and one or more of its components 200–206 may be implemented in an object oriented environment such that one or more of the components are represented by objects with methods and behavior. However, the invention may be implemented in any programming language, object oriented or otherwise, and is not limited in scope to an object-oriented environment.

The Graphical User Interface 200 displays information to the operator and provides the functionality for the operator's interaction with the graphics program 108.

The Image Engine 202 processes the DWG files 206 and delivers the resulting graphics to the monitor 102 for display. In the preferred embodiment, the Image Engine 202 provides a complete application programming interface (API) that allows other computer programs to interface to the graphics program 108 as needed.

The Database 204 is comprised of two separate types of databases: (1) a 3D database 208 known as the "3D world space" that stores 3D information; and (2) one or more 2D databases 210 known as the "2D view ports" that store 2D information derived from the 3D information. One or more 2D databases 210 may also store 2D objects to be utilized by or in combination with 2D viewports 210.

Object List

Figure 3:
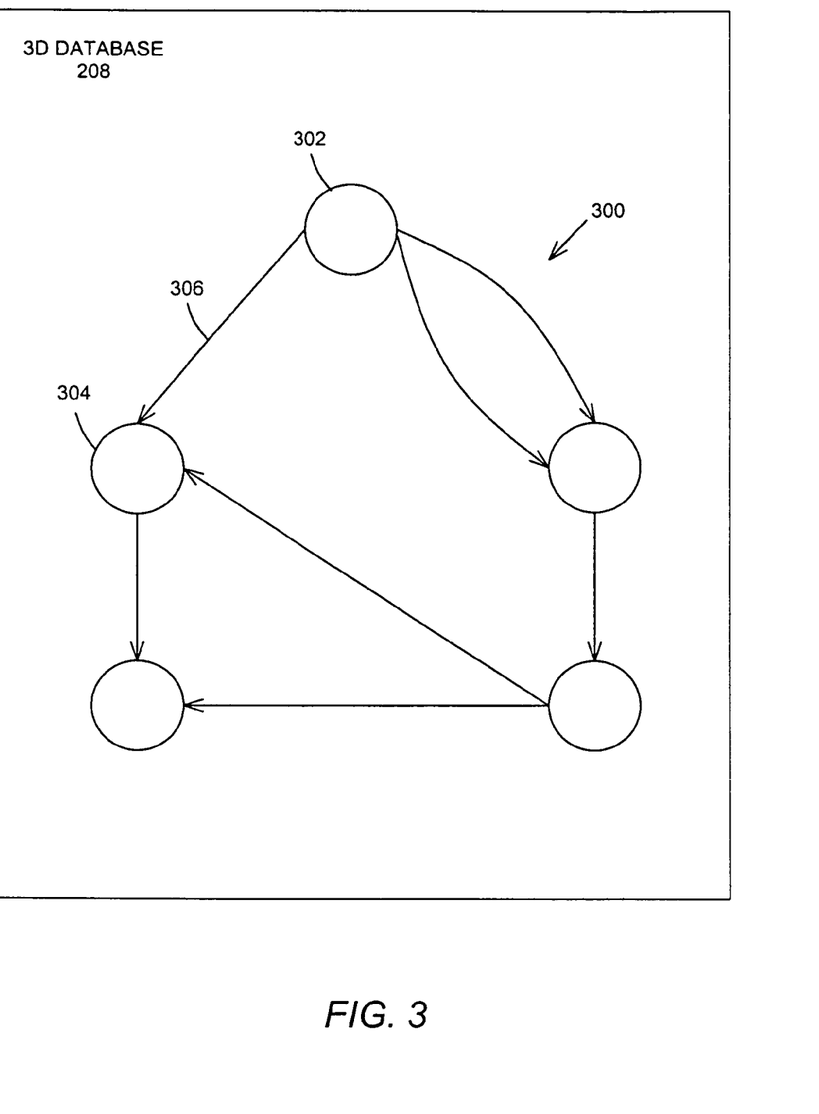
FIG. 3 is a block diagram that illustrates the structure of an object list maintained by each of the three-dimensional database of the computer-implemented graphics program in accordance with one or more embodiments of the invention.

FIG. 3 is a block diagram that illustrates the structure of an object list 300 maintained by the 3D databases 208 according to the preferred embodiment of the present invention. The object list 300 is usually comprised of a doubly linked list having a list head 302 and one or more objects 304 interconnected by edges 306, although other structures may be used as well. There may be any number of different object lists 300 maintained by the 3D databases 208. Moreover, an object 304 may be a member of multiple object lists 300 in the 3D databases 208.

Operation of the Graphics Program

A collection of techniques provide the ability to infer the real construction of a collection of graphical elements. The children of a parent seeking relationships like co-linear, closed polygon, etc., are examined and queries (e.g., a crossing query or selection query) are answered by providing areas that are not specifically stroked but are also inferred to be "real", e.g., spaces in a dashed or patterned line, the area of a closed polygon, etc. Such a solution provides an enhanced selection procedure for physical objects that are represented in a graphically segmented manner. This technique enables a far more natural selection technique that agrees with the human perception of the real world item represented as a partial segmentation in the drawing and reduces operator frustration from the inability to select objects. Further, the technique provides for more accurate object selection when used in combination with an automated query such as a script.

As described above, objects may be represented in various manners by multiple objects. For example, a line may be represented by multiple individual discrete line segments (e.g., solid, dashed, and dotted segments). To pick a line or object in the prior art, the visible portion must be manually selected. Techniques recreate or infer what an object is from its displayed graphical representation. Items that are part of the same object are identified and added to a selection list. Subsequently, all of the items in the selection list are selected when the user attempts to select any one of the individual discrete objects.

With respect to lines, an imaginary line is created and allows the user to select the entire line by selecting the imaginary line. Accordingly, all of the line segments are considered part of one entity. The endpoints for each segment are connected and treated as one segment. Thus, for picking purposes, the various segments are assumed to be one line.

Figure 4A:
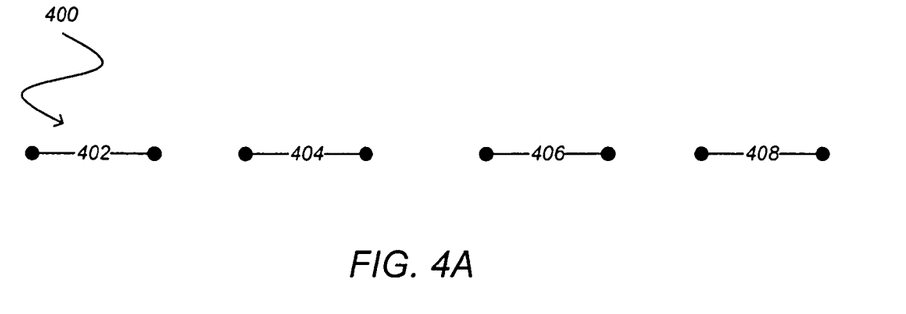
FIGS. 4A and 4B illustrate the use of virtual vectors in accordance with one or more embodiments of the invention.
Figure 4B:
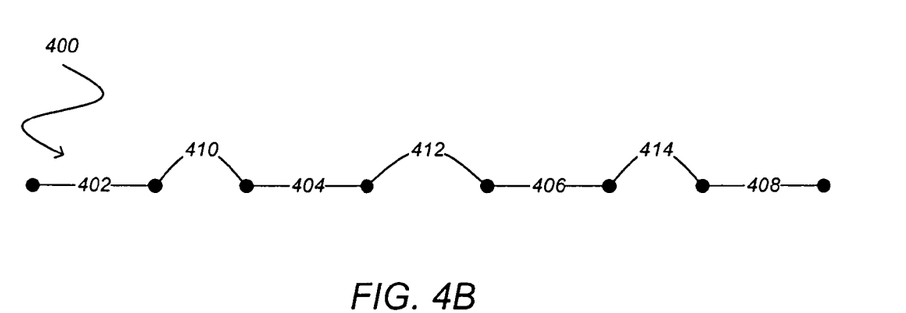

FIGS. 4A and 4B illustrate the creation and use of an imaginary line for user selection. Referring to FIG. 4A, line 400 is a dashed line comprised of multiple discrete line segments 402–408. To select line 400 in the prior art, at least one of the displayed line segments 402–408 must be selected. Segments 402–408 could not be selected by selecting the blank space(s) between the segments.

The endpoints of line segments 402–408 are connected by creating imaginary connectors or virtual vectors 410–414 of FIG. 4B. Vectors 410–414 are displayed as curved lines in FIG. 4B for illustration purposes. The vectors 410–414 may be parallel and aligned with segments 402–408. Once virtual vectors 410–414 have been created, a user can select line 400 (including the discrete segments 402–408 and virtual vectors 410–414) by selecting any one segment 402–408 or virtual vector 410–414. Thus, the physical object represented graphically by the collection of discrete line segments 402–408 is inferred by connecting the discrete line segments and permitting a user to select the inferred line 400.

To determine if a user has selected a line or object, all of the vectors and virtual imaginary vectors that represent connectors between segments are returned. To create the virtual connectors, imaginary line segments connecting the endpoints of each segment are created.

The issue that arises is determining which segments or objects are to be included in the inferred object. In other words, where should virtual vectors be drawn and when should an imaginary line be created. Any method may be utilized to determine which objects to include (or connect).

Assumptions about existing objects may evaluate the relationship between two or more objects or infer certain characteristics about an object. In accordance with such an evaluation, the existing objects and their placement may be examined to determine similarities or relationships. For example, a closed polygon comprised of the polygon's boundary may provide an inference such that the area of the polygon has a relationship with the boundary thereby resulting in a view that the boundary and the area should be considered one object.

Thus, one or more vectors may be drawn and any objects that intersect with the vectors are included in the selection list. For example, in FIGS. 4A and 4B, a vector may be drawn with the tail of the vector at the endpoint of segment 402 and the head equal to or beyond the endpoint of segment 408. Since segments 402, 404, 406, and 408 all intersect with the vector, all four of the segments 402–408 are included in the selection list. Multiple vectors may be utilized to determine which objects to include with non-linear objects (e.g., a circular object, a text object, etc.).

Logic of the Graphics Program

Figure 5:
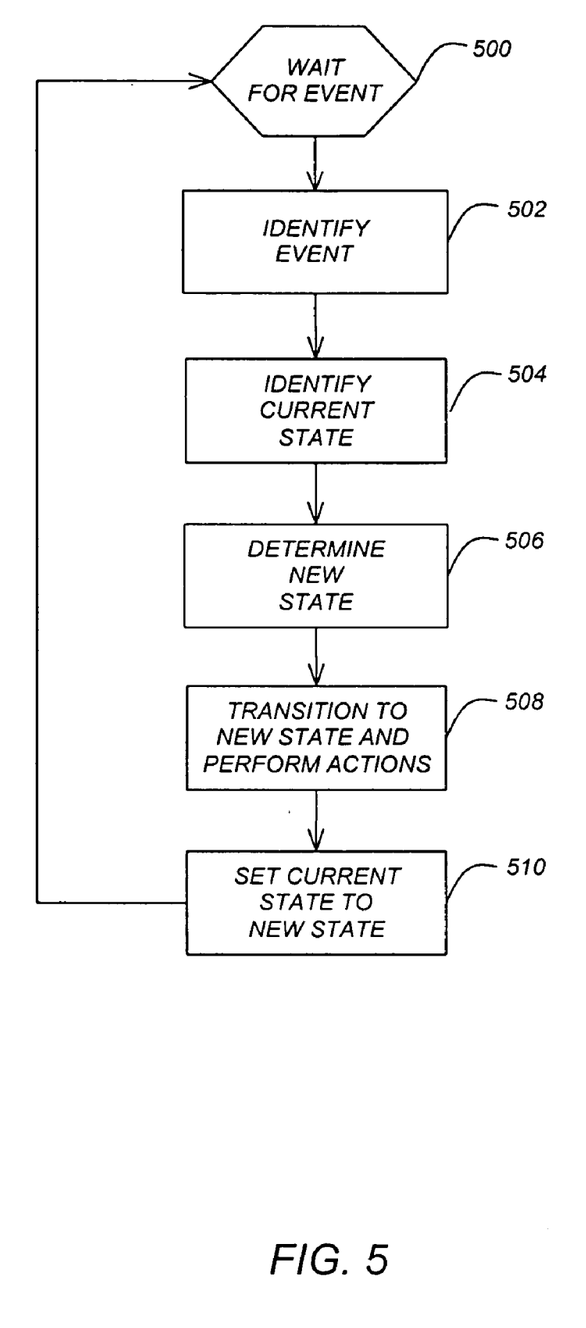
FIG. 5 is a flowchart that illustrates the general logic of a message or event-driven computer-implemented graphics program performing the steps of one or more embodiments of the invention.

A flowchart that illustrates the logic of the graphics program 108 in accordance with one or more embodiments of the invention is shown in FIG. 5. Those skilled in the art will recognize that this logic is provided for illustrative purposes only and that different logic may be used to accomplish the same results.

FIG. 5 is a flowchart that illustrates the general logic of a message or event-driven graphics program 108 performing the steps of one or more embodiments of the invention. In such a graphics program 108, operations are performed when transitions are made, based upon the receipt of messages or events, from present or current states to new states.

Generally, the flowchart begins by waiting at block 500 for an event (e.g., a mouse button click). It should be appreciated that, during this time, other operating system 116 tasks, e.g., file, memory, and video tasks, etc., may also be carried out. When an event occurs, control passes to block 502 to identify the event. Based upon the event, as well as the current state of the graphics program 108 determined in block 504, a new state is determined in block 506. In block 508, the logic transitions to the new state and performs any actions required for the transition. In block 510, the current state is set to the previously determined new state, and control returns to block 500 to wait for more input events.

The specific operations that are performed by block 508 when transitioning between states will vary depending upon the current state and the event. The various operations required to implement and maintain one or more embodiments of the invention represent particular events handled by the logic. However, it should be appreciated that these operations represent merely a subset of all of the events handled by the computer 100.

Figure 6:
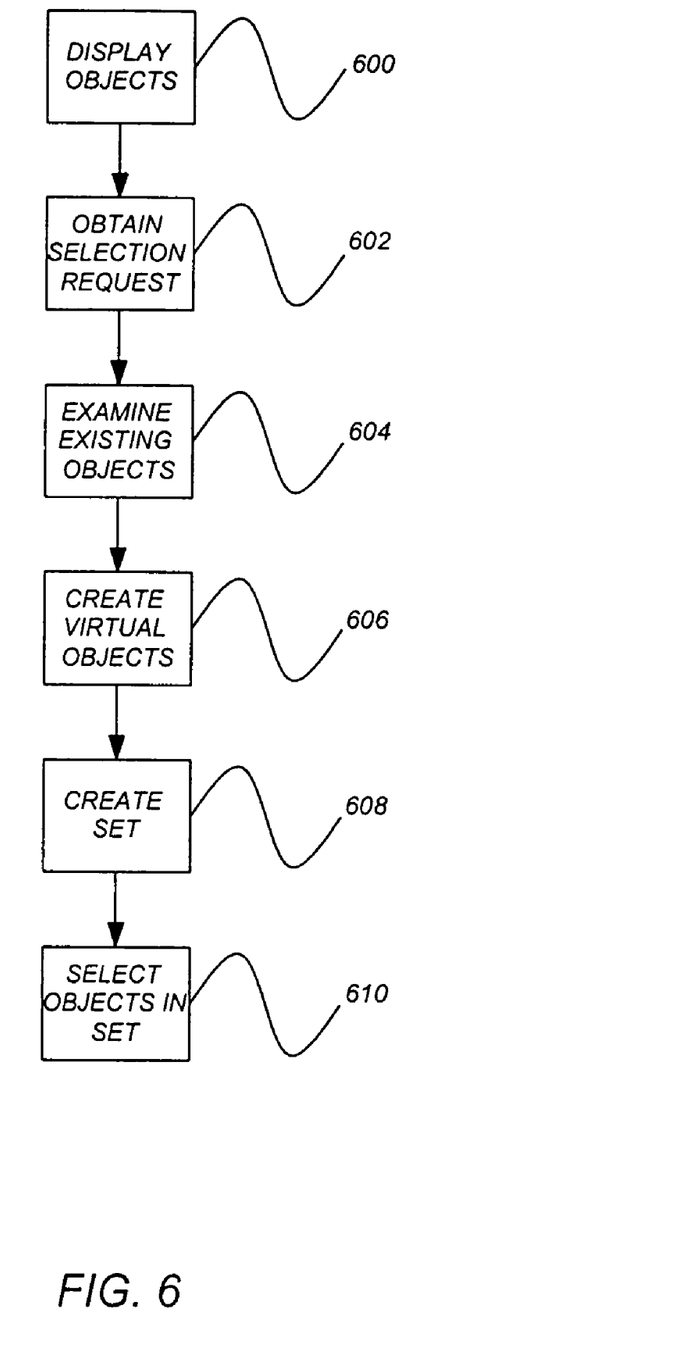
FIG. 6 is a flowchart illustrating object selection in accordance with one or more embodiments of the invention.

FIG. 6 is a flowchart illustrating object selection. At step 600, the objects are displayed in a two-dimensional viewport. At step 602, a selection request is obtained from the user. Similar to the prior art, the selection request may be obtained using a variety of mechanisms. For example, a user can position the cursor over the viewport and "click" a mouse button. At step 604, the existing objects in the viewport are examined to obtain one or more relationships and to determine similarities as described above. At step 606, virtual objects are created. As described above, virtual objects may consist of connectors between line segments, the area of a shape (e.g., a polygon), or other object that may be needed or utilized in answering queries or selecting objects.

At step 608, a selection set is created for related objects as described above. For example, if a dashed line pattern with individual discrete line segment objects are in a viewport, and the virtual objects are the connectors between the discrete line segment objects, the selection set would contain both the individual discrete line segment objects and the virtual objects (connectors). Similarly, a selection set may contain a polygon boundary object and a polygon area virtual object. Thus, the selection set contains the related objects and virtual objects based on the relationships found.

At step 610, the objects in a selection set are selected. Thus, if an user selects an object that exists in any one selection set, the resulting selected items are all of the objects contained within the selection set. The graphics program determines if the selection request is for an object in the selection set, and if so, all of the objects contained within the selection set are selected. Additionally, the individual objects of a set may be selected individually if desired.

CONCLUSION

This concludes the description of one or more embodiments of the invention. The following describes some alternative embodiments for accomplishing the present invention.

For example, any type of computer, such as a mainframe, minicomputer, work station or personal computer, could be used with the present invention. In addition, any program, function, or operating system providing graphical functions could benefit from the present invention.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for selecting objects comprising:
    displaying a two-dimensional viewport of one or more existing objects maintained within a three-dimensional space represented in a computer-implemented graphics system;
    obtaining a selection request from a user using a cursor selection device while locating the cursor in the two-dimensional viewport;
    examining the existing objects to obtain one or more relationships between the existing objects;
    creating one or more virtual objects that are not specifically stroked based on the relationships;
    creating a selection set comprised of at least one of the existing objects and at least one of the virtual objects based on the relationships;
    determining if the selection request is for an object in the selection set; and
    if the selection request is for an object in the selection set, selecting all of the objects in the selection set.

2. The method of claim 1 wherein at least two of the existing objects are line segments and at least one of the virtual objects is a connector connecting the two line segments.

3. The method of claim 2 wherein the cursor is located between the two line segments when the selection request is obtained.

4. The method of claim 1 wherein the relationships are based on a placement of the existing objects.

5. The method of claim 1 wherein the relationships are based on similarities between the existing objects.

6. The method of claim 1 further comprising replying to a query using the objects in the selection set.

7. A computer-implemented graphics system for selecting objects comprising:
    a computer having a monitor attached thereto;
    a graphics program executing on said computer;
    means, performed by the graphics program, for displaying a two-dimensional viewport of three-dimensional space displayed by the graphics program;
    means, performed by the graphics program, for obtaining a selection request from a user using a cursor selection device while locating the cursor in the two-dimensional viewport;
    means, performed by the graphics program, for examining the existing objects to obtain one or more relationships between the existing objects;
    means, performed by the graphics program, for creating one or more virtual objects that are not specifically stroked based on the relationships;
    means, performed by the graphics program, for creating a selection set comprised of at least one of the existing objects and at least one of the virtual objects based on the relationships;
    means, performed by the graphics program, for determining if the selection request is for an object in the selection set; and
    means, performed by the graphics program, for selecting all of the objects in the selection set if the selection request is for an object in the selection set.

8. The system of claim 7 wherein at least two of the existing objects are line segments and at least one of the virtual objects is a connector connecting the two line segments.

9. The system of claim 8 wherein the cursor is located between the two line segments when the selection request is obtained.

10. The system of claim 7 wherein the relationships ate based on a placement of the existing objects.

11. The system of claim 7 wherein the relationships are based on similarities between the existing objects.

12. The system of claim 7, further comprising means, performed by the graphics program, for replying to a query using the objects in the selection set.

13. An article of manufacture embodying logic for selecting objects in a computer-implemented graphics system, the logic comprising:
    displaying a two-dimensional viewport of one or more existing objects maintained within a three-dimensional space represented in a computer-implemented graphics system;
    obtaining a selection request from a user using a cursor selection device while locating the cursor in the two-dimensional viewport;
    examining the one or more existing objects to obtain one or more relationships between the existing objects;
    creating one or more virtual objects that are not specifically stoked based on the relationships;
    creating a selection set comprised of at least one of the existing objects and at least one of the virtual objects based on the relationships;

determining if the selection request is for an object in the selection set; and if the selection request is for an object in the selection set, selecting all of the objects in the selection set.

14. The article of manufacture of claim 13 wherein at least two of the existing objects are line segments and at least one of the virtual objects is a connector connecting the two line segments.

15. The article of manufacture of claim 14 wherein the cursor is located between the two line segments when the selection request is obtained.

16. The article of manufacture of claim 13 wherein the relationships are based on a placement of the existing objects.

17. The article of manufacture of claim 13 wherein the relationships are based on similarities between the existing objects.

18. The article of manufacture of claim 13 further comprising replying to a query using the objects in the selection set.

* * * * *